July 14, 1964 A. HUET 3,140,981
APPARATUS FOR CONTROLLING THE ACTIVITY OF A REACTOR
Filed Sept. 12, 1958
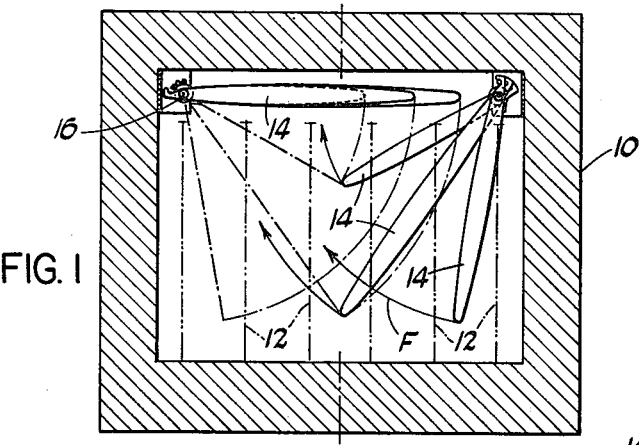
FIG. I
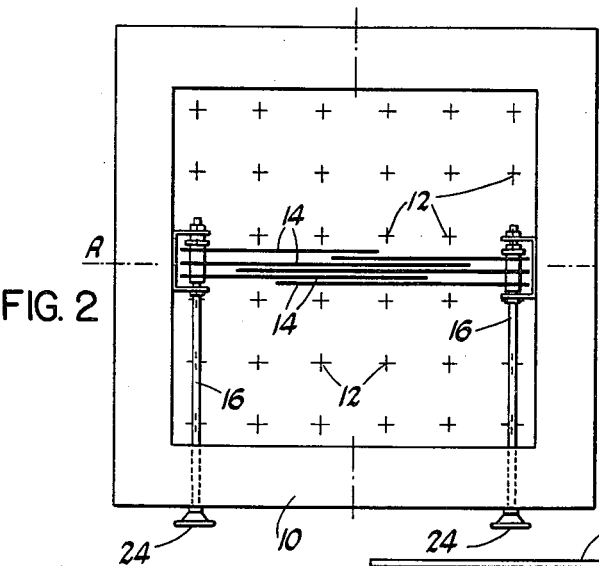
FIG. 2
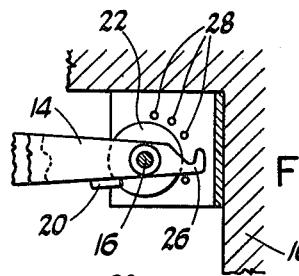
FIG. 3
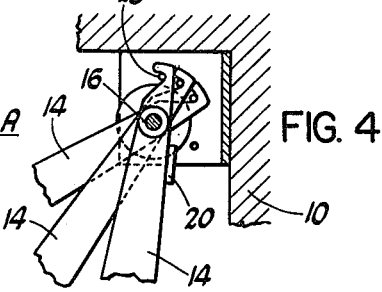
FIG. 4
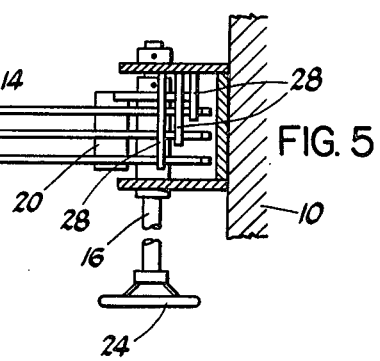
FIG. 5
*INVENTOR.*
ANDRE HUET
BY
ATTORNEY United States Patent Office 3,140,981
Patented July 14, 1964

3,140,981
APPARATUS FOR CONTROLLING THE ACTIVITY
OF A REACTOR
André Huet, 48 Avenue du President Wilson,
Paris 16, France
Filed Sept. 12, 1958, Ser. No. 760,808
Claims priority, application France Sept. 26, 1957
2 Claims. (Cl. 176—35)

This invention relates to nuclear reactors and particularly to control means therefor.

It is known to control the activity of nuclear reactors by means of control or safety rods of, for example, cadmium, which are lowered vertically, generally under their own weight, between the fuel rods of the reactor. Such an arrangement is applicable especially in the case of land installations but is the cause of larger over-all dimensions because of the accessories which must be provided above the reactor for suspending and operating the control rods.

The present invention has for its object a nuclear reactor with control apparatus operating inside the reactor and which can be applied to mobile reactor installations, such as marine installations.

According to the invention the reactor includes control apparatus constituted by rods, or strips of sheet metal, disposed side by side inside the reactor with their axes in a direction normal to the axes of the fuel rods, in which position they do not act to perform the controlling process. When it is desired to regulate the activity of the reactor, these rods or strips, which are articulated at one point thereof, pivot either under the effect of their weight or under the effect of a mechanical device and are spread out fan-wise between the fuel rods, in which position they assume a direction which is oblique with respect to these rods.

It is provided that the dimensions of the rods and the cross-sections thereof may vary from one rod to the other, or even in the same rod, so that in the control position they exert a greater action in those areas of the reactor where the liberation of neutrons is most dense.

The apparatus may be combined with any device for altering the distances between the fuel rods, either mechanically or by vibration, and also with a method of controlling the activity of the reactor comprising the suspension of metal particles absorbing neutrons in the fluid circulating between the rods.

It is possible for the apparatus to be used only in one area of the reactor and even on only one part of the length of the fuel rods.

The following description when read with reference to the accompanying drawings, which illustrate an example of the invention, will make it possible to understand how the invention can be carried into effect.

FIG. 1 is a diagrammatic vertical section of the apparatus mounted inside a reactor;

FIG. 2 is a diagrammatic plan view of the apparatus shown in FIG. 1;

FIGURES 3, 4 and 5 relate to a form of construction of the suspension of the control strips:

FIG. 3 is a cross-section of the ends of the strips pivoting on a shaft and in the folded position;

FIG. 4 is a similar view showing the strips opened out fan-wise;

FIG. 5 is a section showing in plan the articulation of the strips to the shaft.

As will be seen in FIG. 1, inside a reactor shell 10 containing fuel rods shown diagrammatically in chain-dotted lines at 12 in FIG. 1 and are represented by crosses in the plan view of FIG. 2, are mounted control strips or rods 14 which, in the operating condition of the pile, are positioned normally to the axes of the fuel rods 12, as can be seen in the left-hand part of FIG. 1. These rods 14 are pivotally mounted at one end on to a shaft 16 (FIG. 3).

When it is desired to control the reactivity of the pile or terminate it, the rods are spread out fan-wise as can be seen in the right-hand part of FIG. 1, so as to assume directions oblique with respect to the axes of the fuel rods 12 and to be inserted between the latter in order to absorb neutrons.

In the example shown, the rods 14 are mounted on each side in the pile 10 and, in the spread position, form a screen or shield in a substantially median plane A—A of the pile. Of course, it is possible to provide two screens of this kind inside the pile, or two screens disposed at right angles, or any other arrangement which might prove more effective having regard to the distribution adopted for the fuel rods 12.

Movement of the control rods, for passing from the rest or inoperative position to the operative position, can be produced, as in the case described, by gravity or alternatively by means of a suitable mechanical linkage.

In the example shown in FIGS. 3 to 5, the control rods 14 are supported in the inoperative position by a stop or lug 20 fast with a disc 22 slipped on to the shaft 16. The shaft 16 and the disc 22 are controlled for movement from the outside of the reactor by means of the knob 24 abutting against the outside of the wall 10 of the reactor. Each of the moderating or control strips or rods 14 terminates in a hook 26 which is engageable with one of a set of fixed pins 28. The set of pins 28 is suitably distributed as can be seen in FIGS. 3 and 4, so that, in the control position, the rods 14 are spread out fan-wise, as can be seen in FIG. 1 (right-hand part). The pins 28 are adjustable in position in order to regulate the degree of opening of the "fan."

In order to bring the rods 14 back to the folded position (arrow F), it is necessary to rotate the shaft 16 by means of the knob 24 so that the stop 20, in moving back from the position shown in FIG. 4 to the position shown in FIG. 3, raises the rods 14 one by one in succession and closes the fan formed thereby.

The lengths of the rods 14 are, for example, different, as can be seen in FIG. 5, so that those rods which are in the middle of the fan extend further into the pile. Likewise, the dimensions, of width and thickness, of the rods 14 may be different, according to their positions, and may vary along the same rod or strip. The rods 14 may have an elliptical shape, as shown in the figures, so that a larger quantity of metal absorbing the neutrons may be located in those areas of the pile where the flow of neutrons is greatest.

The device described above for moving the rods 14 relies on gravity and may be replaced by a mechanical linkage ensuring the moving apart and the folding back of the said rods whatever the position of the reactor 10.

Instead of the rods 14 covering the entire height of the pile 10, as shown in the figures, they could cover only a certain part thereof and slow down the operation of the pile only over a certain length of the fuel rods 12.

What I claim is:

1. In a nuclear reactor having fuel rods disposed in a reactor shell, and an array of control rods or strips of neutron absorbing material for controlling the reactivity of said reactor mounted entirely inside the reactor shell and above the fuel rods, and means for maintaining the rods or strips of neutron absorbing material in said array in fan-like pivoted relationship about a common pivot point and in a position with their axes normal to the axes of the reactor fuel rods, said means being operable for spreading out the control rods in fan-like manner between the fuel rods when control is to be exercised over the reactivity of the reactor, and said control rods in said array each being of different length, and the planar cross-sections thereof varying from one to the other.

2. In a nuclear reactor having fuel rods disposed in a reactor shell, and an array of control rods or strips of neutron absorbing material for controlling the reactivity of said reactor mounted entirely inside the reactor shell and above the fuel rods, and means for maintaining the rods or strips of neutron absorbing material in said array in fan-like pivoted relationship about a common pivot point and in a position with their axes normal to the axes of the reactor fuel rods, said means being operable for spreading out the control rods in fan-like manner between the fuel rods when control is to be exercised over the reactivity of the reactor and rods in said array each being of different length, and the planar cross-sections thereof varying longitudinally to provide each control rod with a substantially elliptical planar configuration.

References Cited in the file of this patent

UNITED STATES PATENTS

| | | |
|---|---|---|
| 2,736,696 | Wigner et al. | Feb. 28, 1956 |
| 2,919,236 | Zinn | Dec. 29, 1959 |

OTHER REFERENCES

Zinn et al.: "Nuclear Science and Engineering," vol. I (October 1956), pages 420, 423, 434, 435.

Nuclear Power, vol. 1 (September 1956), pp. 205–209.